United States Patent [19]

Haddox

[11] Patent Number: 5,026,094
[45] Date of Patent: Jun. 25, 1991

[54] ADJUSTABLE MUD FLAP ASSEMBLY

[76] Inventor: John Haddox, 2370 S. Maple Grove, Boise, Id. 83709

[21] Appl. No.: 431,083

[22] Filed: Nov. 3, 1989

[51] Int. Cl.$^5$ .............................................. B62D 25/16
[52] U.S. Cl. .................................... 280/848; 280/851
[58] Field of Search ................. 280/847, 848, 851, 155

[56] References Cited

U.S. PATENT DOCUMENTS

| | | | |
|---|---|---|---|
| 3,877,722 | 4/1975 | Conner | 280/154 |
| 4,572,532 | 2/1986 | Early et al. | 280/851 |
| 4,740,003 | 4/1988 | Antekeier | 280/848 |

Primary Examiner—Andres Kashnikow
Assistant Examiner—Richard Camby
Attorney, Agent, or Firm—Frank J. Dykas; Craig M. Korfanta

[57] ABSTRACT

An adjustable mud flap assembly (10) which utilizes the transverse bar member (6) of a trailer hitch assembly (5) as the main support for the mud flaps. Mud flap assembly (10) has a pair of right and left L-shaped mud flap frame members (11 and 22) being removably attached to the ends of the transverse bar member (6). Each L-shaped mud flap frame generally has a rectangular mud flap (12 or 23) removably attached thereto. By varying the radial disposition of the L-shaped mud flap frame member (11 or 22) with respect to the transverse bar member (6), the position of the mud flap with respect to vehicle (1) can be changed. Additionally, utilizing the transverse bar member (6) of the hitch assembly (5) as the support base for mud flap assembly (10), necessarily requires that mud flaps (12 and 23) be positioned at the rear of vehicle (1). This disposes mud flaps (12 and 23) in the trajectory path of any projectile destined for the trailer.

7 Claims, 6 Drawing Sheets

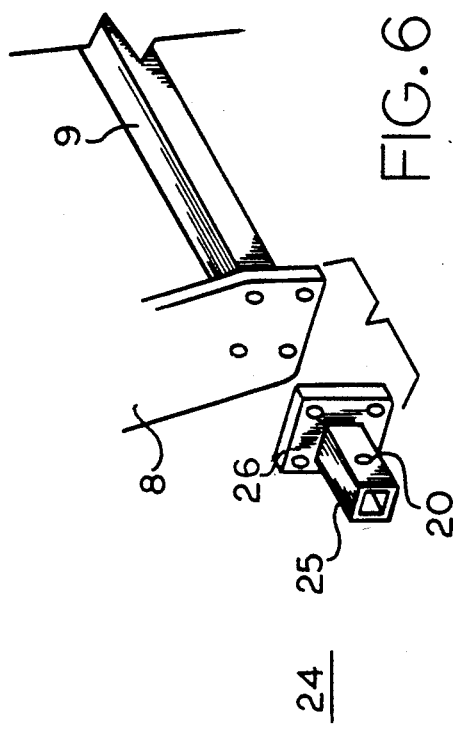

ADJUSTABLE MUD FLAP ASSEMBLY

BACKGROUND OF THE INVENTION

1. Technical Field

This invention generally relates to mud flaps for vehicles and in particular, it relates to a mud flap assembly which utilizes the transverse bar member of a trailer hitch as a mount and support for adjustable position mud flaps.

2. Background Art

Mud flaps are normally permanently attached within a few inches rearward of the rear wheels of a vehicle and serve to protect the rear quarter panels of the vehicle from flying debris such as mud and rocks. The mud flaps are necessarily positioned to hang a few inches off the ground to prevent them from coming in contact with the ground during rough road travel. While the mud flaps do protect the rear quarter panels of the vehicle from flying debris, because they are suspended a distance above the ground they do not prevent projectiles propelled by the vehicle wheels from impinging upon a trailer towed behind the vehicle. This phenomena is graphically depicted in FIG. 1.

Additionally, the mud flaps are frequently torn from their mounting assemblies when operating the vehicle in reverse. Because the flaps are positioned in close proximity to the rear wheels, they can easily be pinched between an object protruding from the ground, such as a curb, and the tire of the vehicle.

Depending upon whether the vehicle is towing a trailer or is heavily loaded with cargo and/or passengers, the distance between the ground and the mud flaps can vary greatly. Hence, the mud flaps have to be shortened to prevent them from dragging on the ground. This means that when the vehicle is unloaded and not in tow, the mud flaps are disposed at an undesirable height above the ground.

What is needed is an adjustable mud flap assembly which can be used in addition to or in lieu of the standard mud flaps previously mentioned which prevents projectiles from the vehicle wheels from impinging upon a tow trailer.

DISCLOSURE OF INVENTION

These and other objects are accomplished by an adjustable mud flap assembly which utilizes the transverse bar member of the trailer hitch assembly as the main support for the mud flaps. The mud flap assembly of the present invention has right and left L-shaped mud flap frame members which are removably attachable to the ends of the transverse bar member. Each L-shaped mud flap frame generally has a rectangular mud flap removably attached thereto. By varying the radial disposition of the L-shaped mud flap frame member with respect to the transverse bar member, the position of the mud flap with respect to the vehicle can be changed. Utilizing the transverse bar member of the hitch assembly as the support base for the mud flap assembly necessarily requires that the mud flaps be positioned at the rear of the vehicle. This disposes the mud flaps directly in the trajectory path of any projectile destined for the trailer. This advantage is graphically depicted in FIG. 2.

The removable attachment means are configured to attach the L-shaped mud flap frames in one of a plurality of radial dispositions with respect to the transverse bar member. In this manner, the position of the mud flap with respect to the vehicle and wheel can be varied. For example, when towing a heavy trailer with a fully loaded vehicle, one would have the mud flap frame positioned in a 90° orientation from horizontal. This disposes the mud flap at its highest point off the ground. Analogously, a 270° orientation of the mud flap frame will dispose the mud flap at its lowest point with respect to the ground. The 0° and 180° orientations correspond to intermediate points which dispose the mud flap at an intermediate point off of the ground and either slightly rearward or slightly forward of the 90° and 270° orientations.

BRIEF DESCRIPTION OF THE DRAWINGS

FIG. 6 is an exploded assembly drawing of a transverse bar member adapter and a closed ended transverse bar member.

BEST MODE FOR CARRYING OUT INVENTION

Figure 1:
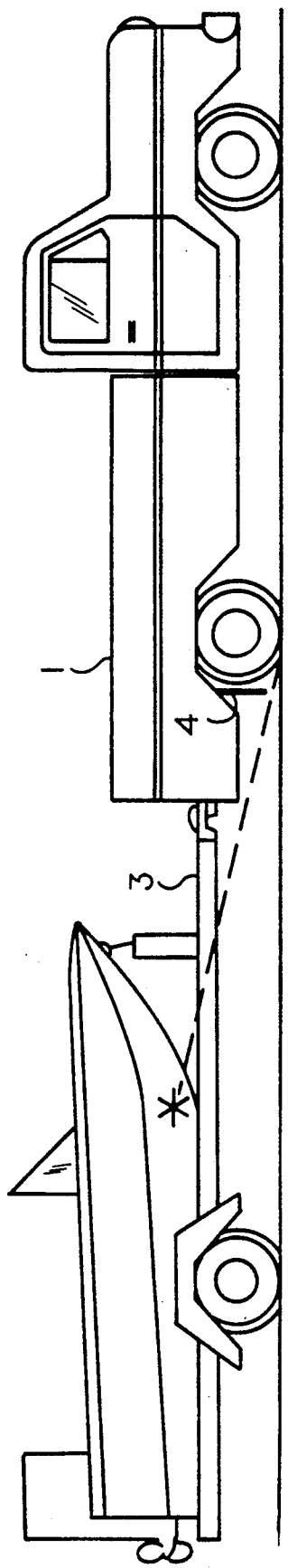
FIG. 1 is a side representational view of the prior art mud flap position.
Figure 2:
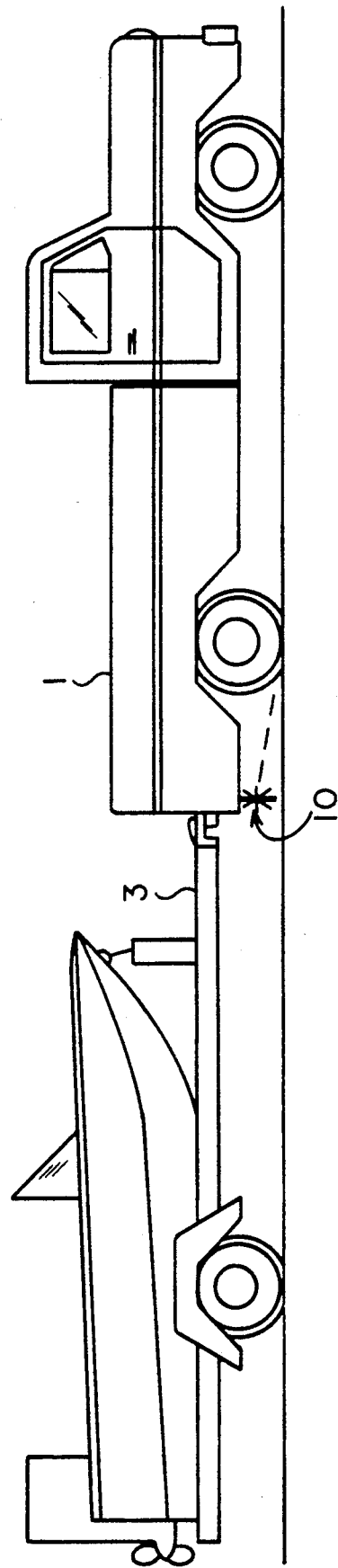
FIG. 2 is a side representational view of the present invention demonstrating the rearward placement of the mud flaps on the vehicle.

Referring now to FIGS. 3-6, the adjustable position mud flap assembly 10 is shown. For the sake of simplicity, only the detailed construction of the left L-shaped mud flap frame 11 and left mud flap 12 is shown, with the right L-shaped mud flap frame 22 and right mud flap 23 here being a mirror image construction of the left side assembly.

Figure 3:
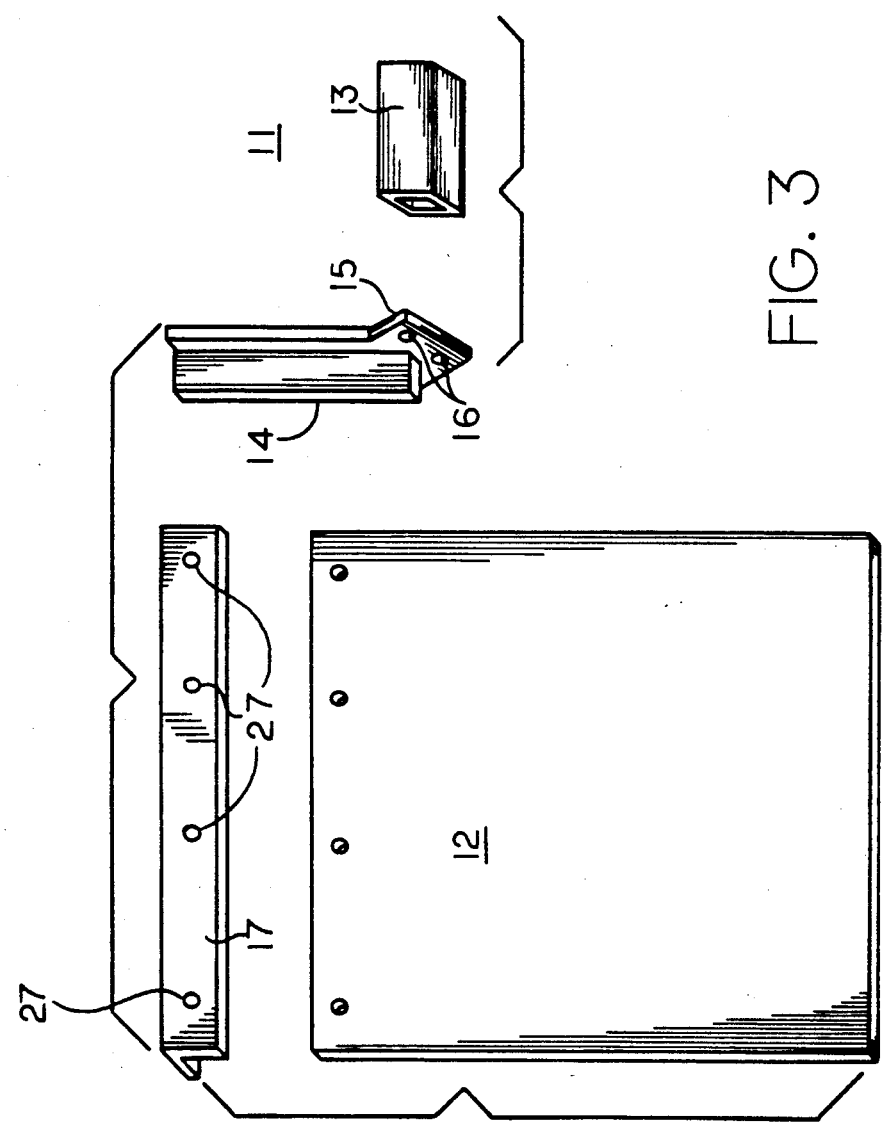
FIG. 3 is an assembly perspective drawing of the left mud flap frame and mud flap.

FIG. 3 shows left L-shaped mud flap frame 11 which includes a left transverse bar member receiving stub 13, left upright frame member 14, left frame mounting plate 15, and left mud flap mounting member 17. Left transverse bar member receiving stub 13 is here constructed from a square metal tube having outside dimensions sized to be closely received by a hollow, square transverse bar member. Both the left upright frame member 14 and the left mud flap mounting member 17 are here constructed from angle iron. Left mud flap mounting member 17 is provided with a plurality of mud flap mounting holes 27 for mounting mud flap 12. Advantageously, mud flap mounting holes 27 are positioned on both the planar faces of the angle iron defining left mud flap mounting member 17. This particular configuration of mud flap mounting holes 27 insures that regardless of the radial disposition of left L-shaped mud flap frame member 11, there will always be a vertical planar surface on which to mount left mud flap 12.

Figure 4:
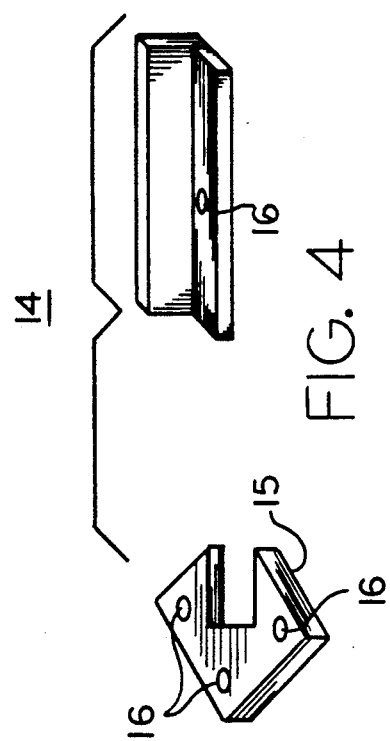
FIG. 4 is an exploded view of the left upright frame member including the frame mounting plate.
Figure 5:
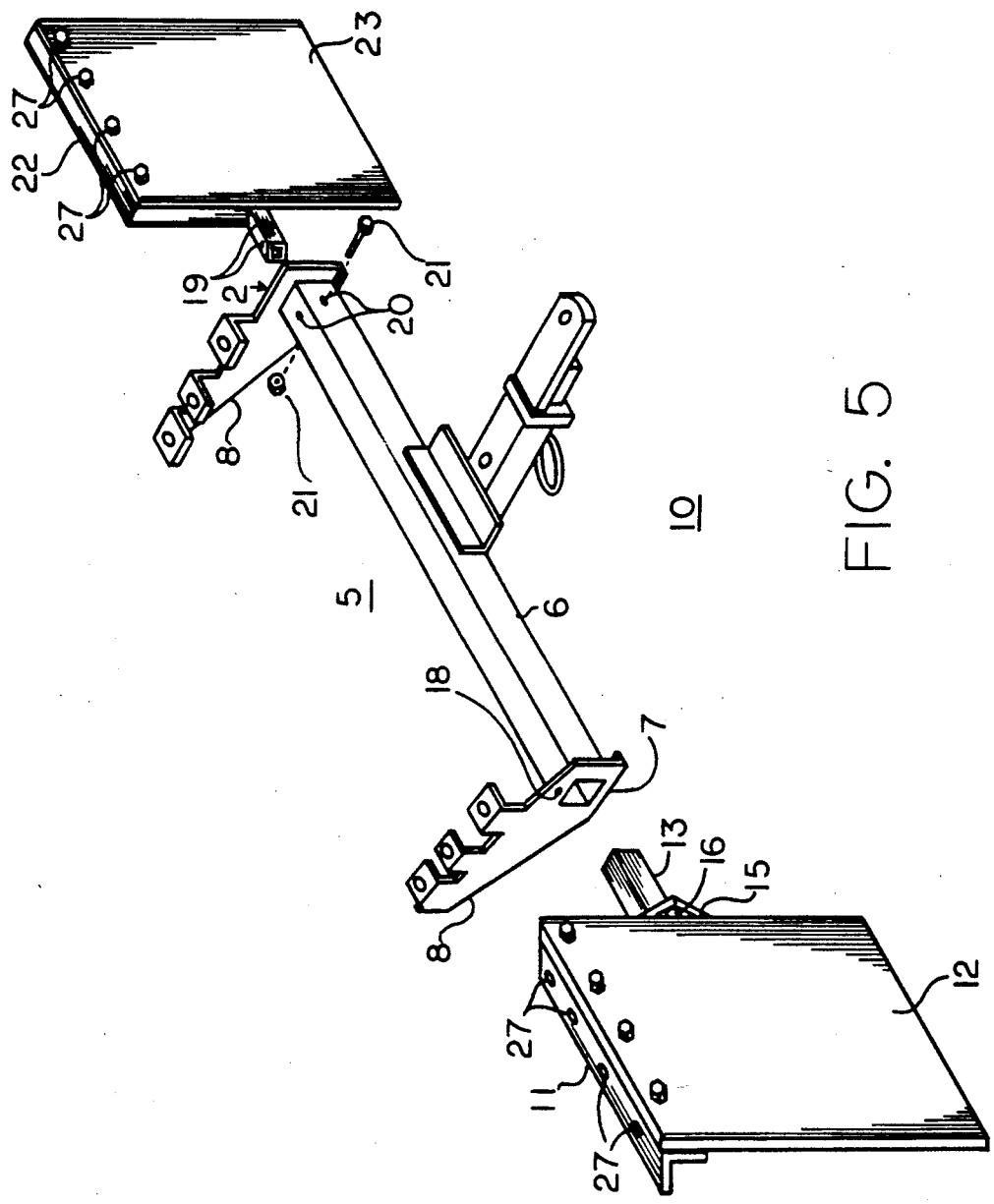
FIG. 5 is a three-quarter elevation view of the adjustable mud flap assembly and a typical trailer hitch assembly including a transverse bar member.

Referring also now to FIG. 4, it can be seen that left upright frame member 14 is provided with an annular array of frame attachment holes 16. This is accomplished by attaching a left frame mounting plate 15 to the bottom end of the upright frame member. It should be apparent that the number of frame attachment holes 16 can be varied. Here, four such holes are shown and correspond to a 0° orientation, a 90° orientation, a 180° orientation, and a 270° orientation. For this particular mud flap frame mounting means, at least one support plate attachment hole 18 is provided in transverse support member or plate 8, as is shown in FIG. 5. A suitable nut and bolt attachment cooperates with one of the frame attachment holes 16 and support plate attachment hole 18 to secure mud flap frame members 11 and 22 in one of a plurality of radial dispositions with respect to transverse bar member 6 of trailer hitch assembly 5.

A typical or standard trailer hitch assembly 5 is shown in FIG. 5 and generally has a transverse bar member 6 secured to the vehicle undercarriage at the rear of the vehicle. There are several different manufacturers and models of trailer hitch assembly 5, most of which include a hollow open-ended transverse bar member 6, the left end of which is shown at 7 and the right end shown at 2.

FIG. 5 also shows an alternative removable mounting means which includes radial stub through holes 19 and a transverse bar through hole 20. A suitable nut and bolt attachment 21 is provided to engage both the transverse bar through hole 20 and radial stub through hole 19. The radially perpendicular disposition of stud through holes 19 again provides for four radial orientations of the L-shaped mud flap frame members 11 and 22.

Some models of the trailer hitch assembly shown in FIG. 5 do not have open ends which extend through the transverse bar support plate 8. FIG. 6 shows a closed-end transverse bar member 9 attached to a transverse bar support plate 8. For this particular configuration of the trailer hitch assembly, the present invention provides a transverse bar member adapter 24 which includes a receiving stub receiving member 25 attached to an adapter mounting plate 26. Transverse bar member adapters 24 are attached to opposing ends of the trailer hitch assembly at the transverse bar support plates 8 and are configured to receive the receiving stubs of the L-shaped mud flap frames. If desired, a flange can be attached around the receiving end of the receiving stub receiving member 25 which includes a support plate attachment hole for attaching the upright frame members of the L-shaped mud flap frames. However here, receiving stub receiving member 25 includes a transverse bar through hole 20 for receiving a nut and bolt attachment extending through a radial stub through hole.

While there is shown and described the present preferred embodiment of the invention, it is to be distinctly understood that this invention is not limited thereto but may be variously embodied to practice within the scope of the following claims.

I claim:

1. An adjustable position mud flap for use on a vehicle a to prevent projectiles propelled by the vehicle's wheel from impinging on a trailer in tow, which comprises:

transverse bar member being attached to the rear underside of the vehicle;

an L shaped mud flap frame having an upright frame member and a horizontal mud flap mounting member and a transverse bar receiving stub attached to a lower end of said upright frame member being configured to position an attached mud flap in any one of a plurality of positions with respect to the wheel of the vehicle and to maintain an attached mud flap in substantially different vertical planes and at different heights in each one of the plurality of positions;

a mud flap being attached to said mud flap frame; along said horizontal mud flap mounting member with said upright frame member extending along an inside edge of said mud flap and removable attachment means located proximate said transverse bar receiving stub, being operably connected between said mud flap frame and said transverse bar member for removably attaching said mud flap frame in one of said plurality of position with respect to said transverse bar member.

2. A mud flap assembly, for use on a vehicle having a trailer hitch assembly having a hollow transverse bar member including right and left end openings, to prevent projectiles propelled by a vehicle's wheel from impinging on a trailer in tow, which comprises:

a pair of L shaped mud flap frames each having an upright frame member and a horizontal mud flap mounting member, said pair of mud flap frames each having a transverse bar receiving stub attached to a lower end of said upright frame member being sized and shaped for engagement in the right and left end openings in said transverse bar member, each mud flap frame being engaged in one end of said transverse bar member in one of a plurality of positions with respect to said transverse bar member, a pair of mud flaps each being attached to one of said mud flap frames; and said L shaped mud flap frames being configured and attached to each said mud flap along each said horizontal mud flap mounting member with said upright frame member extending along an inside edge of each said mud flap; each said plurality of positions maintaining the attached mud flaps in substantially different vertical planes and at different heights;

removable attachment means, located proximate each said transverse bar receiving stub, being operably connected between said mud flap frames and said transverse bar member for removably attaching said mud flap frames in one of said plurality of positions with respect to said transverse bar member.

3. The mud flap frame assembly of claim 2 wherein said transverse bar member is permanently affixed at the rear underside of the vehicle thereby positioning the attached mud flap frames and mud flaps at the rear of the vehicle to prevent projectiles propelled by the vehicle from impinging upon a trailer in tow by the vehicle.

4. The mud flap assembly of claim 3 wherein said attachment means comprises a nut and bolt attachment between said mud flap frame and a transverse bar supporting member.

5. The mud flap frame assembly of claim 3 wherein said attachment means comprises a nut and bolt attachment between said transverse bar member and said transverse bar member receiving stubs.

6. The mud flap assembly of claim 2 wherein said attachment means comprises a nut and bolt attachment between said mud flap frame and a transverse bar supporting member.

7. The mud flap frame assembly of claim 2 wherein said attachment means comprises a nut and bolt attachment between said transverse bar member and said transverse bar member receiving stubs.

* * * * *